March 6, 1934.    O. R. BRINEY    1,949,527
METHOD OF MAKING BUSHINGS
Filed May 31, 1928
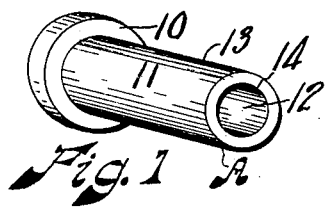
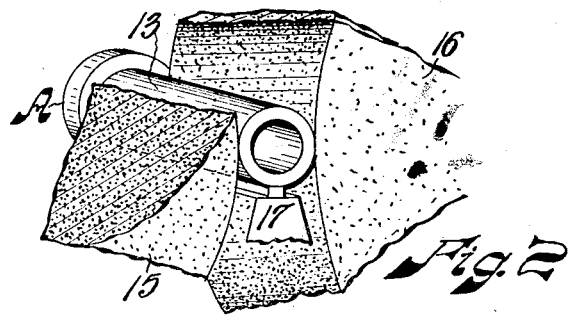
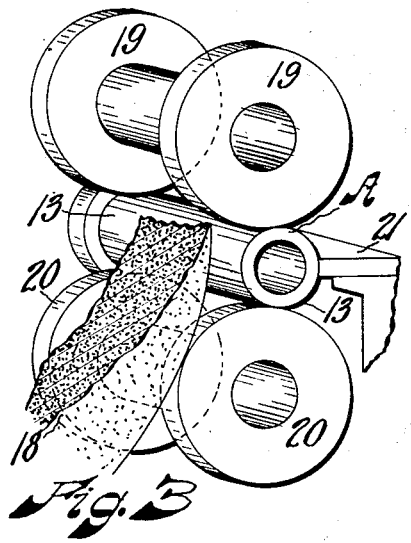
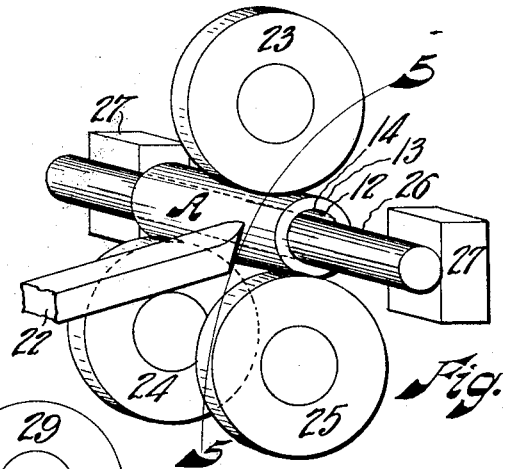
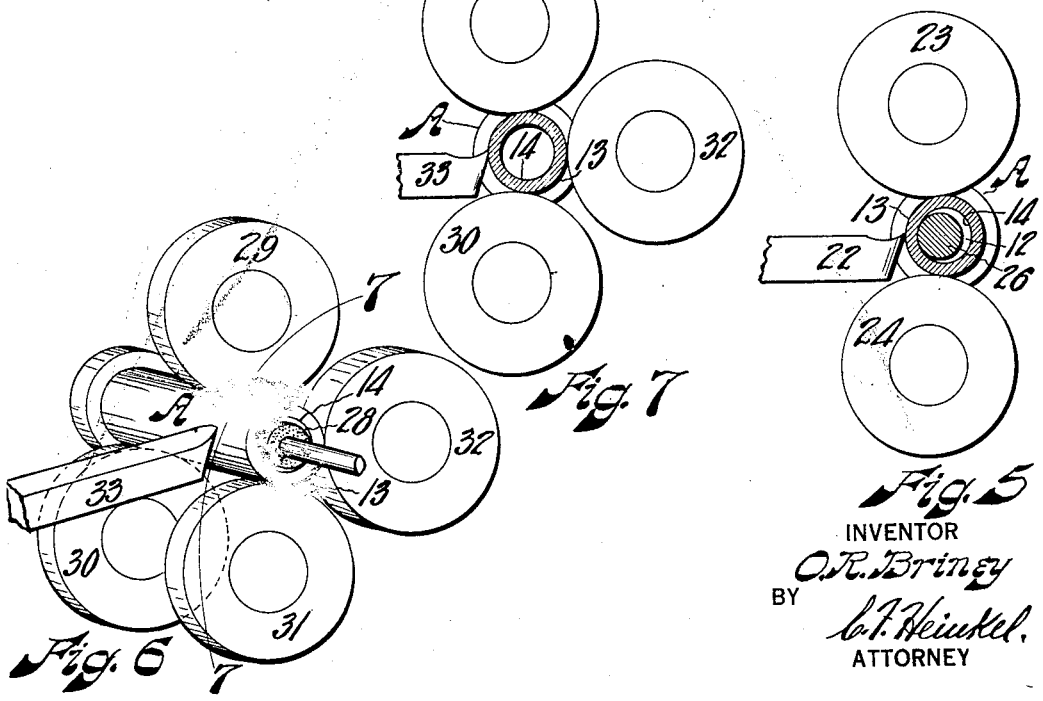
INVENTOR
O. R. Briney
BY
C. F. Heinkel.
ATTORNEY Patented Mar. 6, 1934

1,949,527

UNITED STATES PATENT OFFICE 1,949,527

METHOD OF MAKING BUSHINGS

Ottis R. Briney, Pontiac, Mich.

Application May 31, 1928, Serial No. 281,947

8 Claims. (Cl. 29—149.5)

My invention relates to methods of producing tubular articles and objects of my invention are:—to produce tubular articles in the most economical manner, with true surfaces, and with inner and outer surfaces true with each other. Other objects will be mentioned herein, or will appear, or become apparent or obvious, or will suggest themselves upon an inspection of the accompanying drawing and the following description of the apparatus shown in this drawing and the method attained by this apparatus.

I attain my objects by contacting a surface of the articles against a guiding or positioning means while a machining operation is being performed either on that same surface or on another surface of the same article. These guiding and positing means may broadly be called centerless and chuckless devices or means.

The centerless devices or means mentioned in the just preceding paragraph exclude such devices or means which are driven into the articles or engaging the same in a similar or in an equivalent manner and which may run on centers or the equivelent thereof, such as arbors, or other devices running on centers or in an equivalent manner and themselves holding the articles in definite positions either by the entire inner surface thereof or portions of the inner surface thereof, or all or portions of other surfaces thereof, in such a manner that the articles can not shift their position while the devices or means are carrying or supporting the same.

The chuckless devices or means mentioned in the second preceding paragraph exclude such devices or means which grip the articles in the manner of chucks or collets either by contact with inner or outer surface of the articles.

In order to illustrate how my method may be carried out in practice, I have selected one general type of apparatus, well adapted for the production of bushings, and have shown four exemplifications thereof in the accompanying drawing to clearly illustrate how surfaces can be machined true with each other in the most economical manner. It is clearly understood, however, that I am aware that my invention can be carried out by devices or means other than those so shown and hereinafter described as far as deemed necessary and that variations and changes can be made in the devices shown and in each step and in the succession of steps hereinafter described within the scope of the appended claims.

In the accompanying drawing mentioned above:—

Fig. 1 is a general perspective view of a bushing made by my method.

Fig. 2 is a perspective view of a mechanism adapted to carry out features of my invention by two grinding wheels operating on outer surface of the bushing and a certain guiding or positioning means for the bushing.

Fig. 3 is a perspective view of a mechanism adapted to carry out features of my invention and shows a grinding wheel operating on outer surface of the bushing and combined roller and fixed means guiding or positing the bushing by outer surface thereof.

Fig. 4 is a perspective view of a mechanism adapted to carry out features of my invention and shows a lathe tool operating on outer surface of the bushing while the bushing is guided or posited by outer and inner surface thereof.

Fig. 5 is a section taken in a vertical transverse plane indicated by the line 5—5 in Fig. 4 showing the transverse relations between the bushing and the guiding or positing means more clearly.

Fig. 6 is a perspective view of a mechanism adapted to carry out features of my invention and shows a lathe tool operating on outer surface of the bushing and a grinding wheel operating on inner surface of the bushing and the bushing guided or positioned by outer surface thereof.

Fig. 7 is a section taken in a vertical transverse plane indicated by the line 7—7 in Fig. 6 showing the transverse relations between the bushing and the machining and guiding or positing means more clearly.

Similar reference characters refer to similar parts throughout the views.

The bushing A is shown with the head 10, the round body 11 and the round hole 12 through the same, in the present instance, the outer surface 13 and the inner surface 14 are to be true with each other.

The bushing A is first formed in the rough with sufficient stock for finishing or machining of those surfaces which are to be finished or machined as is well known in the art.

Bushings may be made of hardenable or non-hardenable material as desired. When they are made of hardenable material, they may be hardened after the rough forming operation in which case the grinding wheels shown produce good results for machining purposes although other machining tool or means can be used for the same purpose as long as such tools or means are capable of removing the necessary material in any particular case in hand. Even a polishing wheel will perform a machining operation in some instances but does so economically only when a small quantity of material is to be removed such as the skin after hardening or outer material as in polishing or the like.

As to the machining of the bushing:—

The outer surface 13 may be machined by means of a device or means such as is shown in Fig. 2 wherein the grinding wheels 15 and 16 may rotate in opposite directions and at different speeds to promote rotation of the bushing while the bushing is guided or posited between these two wheels and against the positionally fixed abutment 17 and the bushing is thereby guided or posited by the surface 13 while a machining operation is being performed on this same surface.

The outer surface 13 may also be machined by means of a device or means such as is shown in Fig. 3 wherein the grinding wheel 18 operates on the outer surface 13 while the rotating pairs of rollers 19 and 20, preferably either one pair movable toward and away from the other or both pairs movable toward and away from each other to permit the bushing to easily be inserted into and removed from the device, are rotating and guiding and positing the bushing against the positioning fixed abutment 21 while the rollers and the abutment contact the same surface 13.

The outer surface 13 may also be machined by means of a device or means such as is shown in Fig. 4 wherein the lathe tool 22 operates on the other surface 13 of the bushing while the rotating rollers 23, 24 and 25, preferably movable toward and away from each other to permit the bushing to be easily inserted into and removed from the device, posit or locate the bushing and hold the same against one side of the bar 26 which extends through the hole 12 and the ends of which rest against the blocks 27 as shown but can move laterally thereon so that the bar 26 can adjust itself in accordance or accommodation with the positing of the article by the rollers. In this instance, the bushing is guided and posited by the inner surface 14 and the outer surface 13 while a machining operation is being performed on the outer surface 13. In this style or type of machining, the outer surface of the bushing is machined absolutely true with the inner surface and the wall of the bushing is of equal thickness all around.

The inner surface 14 may be machined by means of a device such as is shown in Fig. 6 wherein the grinding wheel 28 operates on the inner surface 14 while the rotating rollers 29, 30 and 31, preferably movable toward and away from each other to permit the bushing to be easily removed from or inserted into the device, hold or posit or locate the bushing against the rotatable rollers 32. In this instance, the bushing is guided or posited by the outer surface thereof while a machining operation is being performed on the inner surface thereof. In this style or type of machining, the inner surface of the bushing is machined absolutely true with the outer surface and the wall of the bushing is of equal thickness all around.

In order to further economize in the production of bushings, the inner and the outer surfaces of the bushing may be machined at the same time by means of a device or means such as is shown in Fig. 6 wherein the bushing is guided and posited by the rollers 29, 30, 31 and 32 while the lathe tool 33 operates on the outer surface and the grinding wheel 28 operates on the inner surface, in this style or type of machining, the inner and outer surfaces are machined absolutely true with each other and the wall of the bushing is of equal thickness all around.

In either one of the devices shown and described, as well as in other devices of a similar nature or attaining the results in a similar manner, no center supported arbors or similar devices are used since it is well known that centers do not remain true and therefore promote the production of inaccurate work. In my method, whatever arbors or similar devices are used, do not rely on a centering support and the work done therewith will always be accurate irrespective of how much the device wears since the bushing is contacted thereon sidewise only and only one side of the device guides the bushing.

The rollers and the fixed abutments contacting the outer surface of the bushing promote the production of accurate work irrespective or how much these members wear since the outer surface is always contacted by them.

In addition to the above, arbors and the like must be driven into the bushing and thereby consume considerable time and also tend to distort the bushing and probably expand it so that it will contract or again change its distorted form after it is removed from the arbor and therefore can not be depended upon for accuracy of work.

In addition to the above, chucks or collets or similar devices grip the bushing and may distort or contract the same and do not remain true, considerable time is required to insert and remove the bushing in and from such devices and to true it up in the same, and the work produced by such devices can not be depended upon for accuracy of work.

In my method, the bushing is always guided and posited in its natural condition during all machining operations and is not distorted or expanded or contracted by the guiding or positing or holding means; therefore, after the bushing is machined and removed from the machining device, the surfaces of the bushing will be true with each other.

In addition to the above, my method eliminates the expenditures of the time formerly required to hold or to true up the bushing for machining operations.

As set forth above, my invention not only produces more accurate work than the former methods but also does so in a more economical manner than heretofore.

I am aware that devices other than those shown and described can be used to carry out my method and that changes and modifications can be made in the steps shown and described; therefore, without limiting myself to the precise devices shown and described to carry out my method nor to the precise steps herein described.

I claim:—

1. In a bushing production method, first forming a bushing with a hole through the same and the wall thereof of the same thickness all around and then machining outer surface of the bushing while the same is guided by that outer surface.

2. In a bushing production method, forming a bushing with a hole through the same and machining outer surface of bushing while the same is partly guided by a laterally shiftable arbor in contact with the wall of said hole.

3. In a bushing production method, forming a bushing with a hole through the same and machining outer surface of the bushing while the same is partly guided by the inner surface thereof in contact with a guide means free to move substantially square to the machining tool.

4. In a bushing production method, forming a bushing with a hole through the same and machining outer surface of the bushing while the same is guided by a laterally shiftable arbor in contact with the wall of said hole and by said outer surface.

5. In a bushing production method, forming a bushing with a hole through the same and machining outer surface of the bushing while contacting rollers hold the same against a guide through said hole, and movable substantially square to the machining tool.

6. In a bushing production method, forming a bushing with a hole through the same and machining inner and outer surface of the bushing while the same remains in one position.

7. In a bushing production method, forming a bushing with a hole through the same, guiding the bushing by outer surface thereof, and feeding a machining tool across said outer surface.

8. In a bushing production method, forming a bushing with a hole through the same, guiding a bushing by outer surface thereof, and simultaneously feeding a machining tool across said outer surface and feeding a machining tool across the inner surface of the bushing.

OTTIS R. BRINEY.